United States Patent [19]
Ferrando

[11] Patent Number: 5,965,199
[45] Date of Patent: Oct. 12, 1999

[54] CORROSION-RESISTANT COATING PREPARED BY THE THERMAL DECOMPOSITION OF LITHIUM PERMANGANATE

[75] Inventor: William A. Ferrando, Arlington, Va.

[73] Assignee: The United States of America as represented by the Secretary of the Navy, Washington, D.C.

[21] Appl. No.: 08/939,410

[22] Filed: Sep. 29, 1997

[51] Int. Cl.$^6$ .................................. B05D 3/02; B05D 3/00
[52] U.S. Cl. ..................... 427/226; 427/180; 427/314; 427/318; 427/327
[58] Field of Search ..................................... 427/226, 314, 427/318, 327, 376.2, 376.4, 180

[56] References Cited

U.S. PATENT DOCUMENTS

| | | | |
|---|---|---|---|
| 3,900,601 | 8/1975 | Franz et al. | 427/108 |
| 3,943,042 | 3/1976 | Cook, Jr. | 204/95 |
| 4,079,174 | 3/1978 | Beck et al. | 429/198 |
| 4,256,545 | 3/1981 | Deborski | 204/290 R |
| 4,448,919 | 5/1984 | Murase | 524/394 |
| 4,568,785 | 2/1986 | Jaecker | 585/500 |
| 4,913,708 | 4/1990 | Kalinowski | 51/295 |
| 5,358,623 | 10/1994 | Bibber | 205/201 |

*Primary Examiner*—Shrive Beck
*Assistant Examiner*—Michael Barr
*Attorney, Agent, or Firm*—John Forrest; Roger D. Johnson

[57] ABSTRACT

A ceramic, metal, or metal alloy surface is covered with lithium permanganate which is then thermally decomposed to produce a corrosion resistant coating on the surface. This coating serves as a primer coating which is preferably covered with an overcoat of a sealing paint.

12 Claims, No Drawings

CORROSION-RESISTANT COATING PREPARED BY THE THERMAL DECOMPOSITION OF LITHIUM PERMANGANATE

BACKGROUND

This invention relates to coatings and more particularly to metal oxide coatings.

Chromate coatings have been employed widely in corrosion protection of aluminum alloys and steel. The waste products of these processes are poisonous and carcinogenic materials which pose a danger to the environment. This is particularly true for the hexavalent chromium ion which is an especially potent carcinogen. As a result, chromate forming processes require expensive equipment and processing steps to protect the environment.

Therefore, it would be desirable to provide a new corrosion resistant coating that could be produced without harmful waste products. Such a coating would not only be less expensive, but it could also be produced on site with mobile equipment rather than in special plant facilities.

SUMMARY

Accordingly, an object of this invention is to provide new corrosion-resistant metal oxide coatings.

Another object of this invention is to provide a new method of producing corrosion-resistant metal oxide coatings.

A further object of this invention is to provide a new method of producing corrosion-resistant metal oxide coating which will not be harmful to the environment.

Yet another object of this invention is to provide a method of producing corrosion-resistant metal oxide coatings safely in the field using simple equipment.

A still further object of this invention is to provide a less expensive method of producing corrosion-resistant metal oxide coatings.

These and other objects of this invention are achieved by providing a process for forming a metal oxide coating comprising A. heating a diamond, ceramic, metal, or metal alloy surface to a temperature above 190° C.;

B. covering the heated surface with lithium permanganate (LiMnO$_4$.3H$_2$O) powder as a precursor; and C. allowing the lithium permanganate to decompose and form a metal oxide coating on the heated surface.

The black coating produced is corrosion-resistant, and probably composed of a mixture of metal oxides.

The metal oxide coating is best used as a primer coating and preferably should be physically protect by a coating of conventional sealer paint such as epoxies or polyurethanes.

DESCRIPTION

In the process of the present invention, the object or surface which is to be protected is heated to a temperature of above 190° C. and then is covered with powdered lithium permanganate (LiMnO$_4$.3H$_2$O) as a precursor. The lithium permanganate melts and then decomposes at 190° C. to form a hard, black, corrosion-resistant coating on the surface. During the application and the melting stages the lithium permanganate is preferably spread around on the surface to assure a more uniform covering on the surface. This is necessary because the lithium permanganate decomposes at the same temperature that it melts at and therefore normal wetting of the surface with the molten lithium permanganate is not available as a means of distribution. After the decomposition, any loose or excess lithium permanganate or decomposition product is brush off, leaving just the coating adhering to the surface.

The precise chemical composition of the coating produced from the thermal decomposition of the lithium permanganate precursor has not been determined. However, the physical properties such as color and hardness and the chemical properties such as corrosion resistance to hydroxyl ions and chloride ions are consistent from coating to coating. Therefore, referring to the coating as the thermal decomposition product of lithium permanganate has precise and consistent meaning. A possible reaction equation for the decomposition may be as follows:

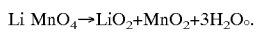

$$\text{Li MnO}_4 \rightarrow \text{LiO}_2 + \text{MnO}_2 + 3\text{H}_2\text{O}.$$

Another technique is to form saturated solutions of lithium permanganate in a suitable organic solvent such as ethyl acetate. The solution may be painted on to the surface at ambient temperature and the surface is then heated to drive off the solvent and eventually decompose the lithium permanganate to produce the corrosive resistant coating. Several applications of the solution may be used to achieve the coating thickness desired. In addition, this method produces a more uniform distribution of the coating.

Water does not work as well as a solvent in this process. It produces coatings which are less adherent to aluminum and aluminum alloys than those produced using ethyl acetate. In the case of steels, actual pockets of nascent rusting can occur in the water drying stage of the process. This likewise interfers with the adherence of the final metal oxide coating to the steel.

The lithium permanganate decomposition product coating of this invention is intend for use as primary coating and preferably should be used in combination with a sealing paint overcoat such as an epoxy or a polyurethane based paint. The corrosion resistance of the lithium permanganate decomposition product coating is dependent on the ability of the coating to adhere to the surface. An overcoat of sealing paint improves the adherence of the corrosion resistant primary coating to the surface and helps protect the primary coating from external physical damage. On the other hand, the lithium permanganate decomposition product coating provides a resistance to corrosion that the sealing paint cannot provide by itself. Without the lithium permanganate decomposition product primary or undercoating, small punctures or abrasions in the sealing paint coating will result in large areas of corrosion on the steel surface that will undermine the sealing paint coating. Thus the strength of each coating compensates for the weakness of the other.

Although temperature of 190° C. and above work in this process, the surfaces or object to be coated are preferably heated to from more than 190° C. to 300° C., more preferably from 200° C. to 250° C., and still more preferably from 210° C. to 230° C. Again, if a saturated solution of lithium permanganate in a suitable solvent such as ethyl acetate is painted on to the surface, this can be done a lower temperature (e.g., ambient), and the object or surface can be heated up to the required temperature for decomposition.

The processes of this invention can be used to produce lithium permanganate thermal decomposition product corrosion resistant coatings on metal or metal alloy surfaces or on ceramic surfaces. These corrosion resistant coatings can be produced on steel, aluminum, aluminum alloys, magnesium, magnesium alloys, copper, and copper alloys, as well as other metals and alloys. These corrosion resistant coatings can also be produced on ceramic materials including both oxide and nonoxide ceramic materials. Examples of suitable oxide ceramic materials include zircon, mullite, alumina, cordierite, titanium oxide, silica, celsian, etc. Examples of suitable nonoxide ceramic materials include silicon carbide, silicon nitride, boron carbide, boron nitride, aluminum nitride, etc. Because of the simplicity of the present coating process, specific materials are easily tested for suitability for the process. In fact, substantial numbers of candidate materials may be tested at the same time.

The general nature of the invention having been set forth, the following examples are presented as specific illustrations thereof. It will be understood that the invention is not limited to these specific examples but is susceptible to various modifications that will be recognized by one of ordinary skill in the art.

All solution percentages in the examples are by weight.

EXAMPLE 1

Flat Aluminum 6061 Coupons in 5% KOH

Two Aluminum 6061 flat coupons about 4 cm$^2$ in area by 2 mm in thickness were cleaned by glass bead blasting. One was designated as a control and sprayed with a clear Krylon coating. The second was placed on a shallow Pyrex dish atop a hot plate. This coupon was heated to about 200° C. while lithium permanganate powder was applied to its surfaces. The powder became molten and decomposed as it was spread onto the surfaces. The excess material was brushed from the surfaces, leaving an adherent insoluble black coating of the thermal decomposition product of lithium permanganate.

The coupons were immersed in a 5% aqueous solution of potassium hydroxide (KOH) at a temperature of 45° C. for about 15 hours. The control sample completely disintegrated, while the lithium permanganate thermal decomposition product coated sample evidenced no weight loss. Thus the hydroxyl attack was effectively inhibited by the coating produced by the decomposition of the lithium permanganate.

EXAMPLE 2

Common Aluminum Rivets in 5% KOH

Two common aluminum rivets, each weighing about 1 gram, were tested. The first was sprayed with a clear Krylon coating and used as a control. The second was coated with lithium permanganate which was then decomposed to produce a black coating by the method used in example 1. Both rivets were immersed in an aqueous 5% KOH solution at 30° C. for about 16 hours. The Krylon coated control rivet showed extreme erosion with a final weight of 0.45 g. In contrast, the rivet coated with the thermal decomposition product of lithium permanganate suffered much milder deterioration and had a final weight of 0.81 g.

EXAMPLE 3

Small Aluminum Alloy Brackets in 5% KOH

Two small aluminum alloy brackets (of unknown pedigree) were chosen for testing. The surfaces of both brackets were cleaned by glass bead blasting. The first bracket was sprayed with a clear Krylon coating and designated as the control sample. A paint was devised by preparing an approximately saturated solution of lithium permanganate (LiMnO$_4$.3H$_2$O) in ethyl acetate. Several coats were applied to the surface, followed by decomposition of the lithium permanganate at about 220° C. The Krylon coated control bracket weighed 5.68 g and the thermal decomposition product of lithium permanganate coated bracket weighed 5.98 g. The brackets were then immersed in an aqueous 5% KOH solution at 35° C. for 24 hours. The final weight of the control bracket was 4.67 g and the final weight of the lithium coated bracket was 5.97 g. Again, the lithium permanganate thermal decomposition product coating provided good protection against dissolution by the hydroxyl ion.

EXAMPLE 4

Steel Plate in a Salt Humid Atmosphere

A more practical corrosion situation involves exposure to a humid salt atmosphere (presence of the chloride ion). A small chamber was set up to produce this condition. It consisted of a glass dome, Teflon tray with a small pedestal rack, thermometer and electric warming plate. A 3.5% solution of NaCl in deionized water was placed in the tray. A mild steel plate (coupon) about 3"×3"×⅛" was cleaned by glass bead blasting. A protective coating of the thermal decomposition product of lithium permanganate was formed according to the procedure of example 3. The coupon was first wetted in the NaCl solution and then placed on the rack above the liquid level. The dome was installed over the tray on the warming plate. the temperature of the chamber was stabilized at about 60° C. and left overnight. The results indicated good corrosion protection of the lithium permanganate thermal decomposition product coated steel surface. It should be noted that the degree of corrosion protection appears to be dependent on a thorough bonding of the coating. Other steel coupon surfaces under the same exposure conditions showed varying degrees of attack. It should be emphasized that the lithium permanganate thermal decomposition product coating is intended as an undercoating and will require a top sealing coating to be effective for most applications.

EXAMPLE 5

Aluminum Alloy Surface in a Salt Humid Atmosphere

Several 6061 aluminum alloy coupons approximately 1 inch square were cleaned by glass bead blasting. The coupons were then coated with the thermal decomposition product of lithium permanganate using the procedure of example 3. The coated coupons were then placed in the chamber used in example 3 and exposed at 60° C. for 24 hours. Uncoated aluminum coupons were also tested under similar conditions.

The lithium permanganate decomposition product coated aluminum coupons were compared visually with the uncoated aluminum coupons. The results indicated that the lithium permanganate decomposition product coating provides a good degree of protection.

Obviously, other modifications and variations of the present invention may be possible in light of the foregoing teachings. It is therefore to be understood that within the scope of the appended claims the invention may be practiced otherwise than as specifically described.

What is claimed is:

1. A process for forming a corrosion-resistant metal oxide coating on a surface comprising:

A. heating a diamond, ceramic, metal, or metal alloy surface to a temperature above 190° C.;

B. covering the heated surface with lithium permanganate powder; and

C. allowing the lithium permanganate to decompose and form a metal oxide coating on the heated surface.

2. The process of claim 1 wherein the surface is heated to a temperature of from more than 190° C. to 300° C.

3. The process of claim 2 wherein the surface is heated to a temperature of from 200° C. to 250° C.

4. The process of claim 3 wherein the surface is heated to a temperature of from 210° C. to 230° C.

5. The process of claim 1 wherein the heated surface is a metal or metal alloy surface.

6. The process of claim 5 wherein the heated surface is a steel surface.

7. The process of claim 5 wherein the heated surface is an aluminum or an aluminum alloy surface.

8. The process of claim 1 wherein the heated surface is a ceramic surface.

9. The process of claim 8 wherein the heated surface is an oxide ceramic surface.

10. The process of claim 9 wherein the oxide ceramic is zircon, mullite, alumina, cordierite, titanium oxide, silica, or celsian.

11. The process of claim 8 wherein the heated surface is a nonoxide ceramic surface.

12. The process of claim 11 wherein the nonoxide ceramic is silicon carbide, silicon nitride, boron carbide, boron nitride, or aluminum nitride.

* * * * *